(12) United States Patent
Happel

(10) Patent No.: US 8,034,236 B1
(45) Date of Patent: Oct. 11, 2011

(54) STORM WATER FILTER SYSTEM HAVING A FLOATING SKIMMER APPARATUS

(76) Inventor: Thomas H. Happel, Cocoa, FL (US)

( * ) Notice: Subject to any disclaimer, the term of this patent is extended or adjusted under 35 U.S.C. 154(b) by 11 days.

(21) Appl. No.: 12/387,583

(22) Filed: May 6, 2009

Related U.S. Application Data

(63) Continuation-in-part of application No. 12/315,820, filed on Dec. 8, 2008, now Pat. No. 7,846,327.

(60) Provisional application No. 61/009,086, filed on Dec. 27, 2007.

(51) Int. Cl.
*E03F 5/14* (2006.01)

(52) U.S. Cl. ............ 210/162; 210/170.03; 210/242.1; 210/242.4; 210/532.1; 210/538

(58) Field of Classification Search ............ 210/122, 210/154, 156, 162, 163, 170.03, 242.1, 242.2, 210/532.1, 538, 242.4
See application file for complete search history.

(56) References Cited

U.S. PATENT DOCUMENTS

| | | | | |
|---|---|---|---|---|
| 5,078,863 A * | 1/1992 | Durigon | | 210/242.1 |
| 5,378,376 A * | 1/1995 | Zenner | | 210/242.1 |
| 6,797,161 B2 * | 9/2004 | Use et al. | | 210/532.1 |
| 6,869,525 B1 | 3/2005 | Happel | | |
| 7,025,888 B2 * | 4/2006 | Thompson et al. | | 210/242.1 |
| 7,294,256 B2 | 11/2007 | Happel et al. | | |
| 2009/0166279 A1 * | 7/2009 | Happel et al. | | 210/170.03 |
| 2010/0032363 A1 * | 2/2010 | Happel | | 210/242.1 |
| 2010/0078370 A1 * | 4/2010 | Happel | | 210/122 |
| 2010/0147756 A1 * | 6/2010 | Duran et al. | | 210/170.03 |
| 2010/0230338 A1 * | 9/2010 | Happel | | 210/170.03 |

* cited by examiner

*Primary Examiner* — Christopher Upton
(74) *Attorney, Agent, or Firm* — William M. Hobby, III

(57) ABSTRACT

A floatable skimmer apparatus is movably attached in a storm water filter box with a pair of tracks attached in the housing chamber of the filter box. A floatable skimmer has a skimmer panel having floatation members attached to the inlet side of the storm water filter box for raising and lowering the skimmer panel responsive to the rise and fall of storm water in the housing chamber. Storm water is forced under the bottom of the floatable skimmer panel while blocking floatable debris from entering the housing chamber outlet. A floatable hydrocarbon absorbing boom is attached to the skimmer panel and floated independent thereof.

19 Claims, 5 Drawing Sheets

STORM WATER FILTER SYSTEM HAVING A FLOATING SKIMMER APPARATUS

This patent application is a continuation-in-part application of my U.S. patent application Ser. No. 12/315,820, filed Dec. 8, 2008 now U.S. Pat. No. 7,846,327 for a Storm Water Filter System Having a Floating Skimmer Apparatus, and U.S. patent application Ser. No. 61/009,086, filed Dec. 27, 2007 for a Floating Skimmer Apparatus.

BACKGROUND OF THE INVENTION

The present invention is a storm water filter system for skimming debris from storm water passing through a storm water drain system and more specifically, the present invention is directed towards a storm water filter box having a floatable skimmer therein for capturing floatable debris and trash in the storm water system.

Drain water, which is frequently laden with trash, grass clippings, tree limbs, sand, gravel and other forms of sediment, as well as floatable trash and floatable oil is collected from streets, parking lots and other areas into a storm drain inlet where it is directed into a storm drain pipe system. The drain water laden with trash collected from the streets is fed through an entrance into a storm water catch basin and into a lake or retention pond or the like. The retention pond can tolerate a certain amount of grass clippings collected from parking lots along the streets but debris left in water for a long period of time decays and allows a build up of soluble nutrients, such as nitrates and phosphates, in the water. Thus, it is desirable to remove organic debris from the water collected from the drain water before it enters lakes and retention ponds. At the same time, drain water collects residue oil, and floatable hydrocarbons and organic materials from parking lots and streets and it is also desirable to prevent the floating hydrocarbons being discharged into the lakes or retention ponds. Typically, a skimmer is utilized to capture hydrocarbons and floating liquids within a baffle box to prevent their passing into the outlet.

The present invention is directed towards a skimmer to prevent floatable trash and floatable hydrocarbons from passing out the outlet of a storm water drain system baffle box.

In my prior U.S. Pat. No. 6,869,525 for a Storm Drain Filter System I show a storm drain filter system which includes a skimmer for collecting floating hydrocarbons and for absorbing the hydrocarbons in a hydrocarbon absorbing boom while preventing them from passing out of the skimmer. In my prior U.S. Pat. No. 7,294,256 for a Storm Water Filter System, a storm water filter system is provided for filtering storm water being fed into an in-ground well and uses a fixed skimmer to prevent floating organic debris from entering the discharge into the in-ground recharge well.

The present invention is directed towards an improvement in storm water filter systems in which a filter box has a skimmer for capturing debris and floating organic matter in a storm water filter box and blocking the floating debris from the outlet. Drain water entering a baffle box sometimes flows in very fast and allows the water to rise above a fixed skimmer. This allows floating trash and floating oil and hydrocarbons to go over the top of the skimmer and out the outflow pipe into rivers, lakes or retention ponds. The present invention provides for a floating skimmer that prevents this overflow and forces the drain water passing through the filter box to go under the skimmer and into the outlet.

In the present invention a relative short floating skimmer is used and has the same performance of a much taller fixed skimmer without the head loss associated with a taller skimmer by opening up a larger passageway under the skimmer. A storm water treatment structure that makes use of a floating skimmer can be more easily retrofitted to an existing water shed storm drain system due to the minimal head loss of the shorter skimmer.

SUMMARY OF THE INVENTION

A floatable skimmer apparatus is provided for a storm water filter box for capturing floatable debris and preventing the debris from entering the filter box outlet. The storm water filter box has a housing having a chamber having an inlet thereinto and an outlet therefrom. A skimmer panel is mounted in the housing chamber with a pair of skimmer tracks which allow the skimmer panel to move in the tracks. The skimmer panel has a top and a bottom and is positioned in the housing chamber between the inlet and outlet of the housing chamber and is positioned to form a channel under the skimmer panel as the storm water moves from the inlet through the storm water filter box to the outlet. One or more floatation members are mounted on the skimmer panel on the inlet side of the skimmer panel and each is spaced from the skimmer panel to allow water in the housing chamber between each floatation member and the skimmer panel. The floatation raises and lowers the skimmer panel within the skimmer tracks as the storm water in the housing chamber rises and falls. The storm water is thus forced under the bottom of the floatable skimmer panel while blocking floatable debris from entering the housing chamber outlet. The skimmer panel has a niche formed on the top thereof with each floatation member mounted in the niche. The niche has an angled base to allow debris between a floatation member and the skimmer panel to egress therefrom. Each floatation member has a plurality of studs or spacers to space the floatation member from the skimmer panel. The skimmer panel also has core buoyancy material, such as polystyrene foam, formed in the panel. The skimmer panel has a pair of side edge portions, each having a plurality of rollers mounted thereto for the skimmer panel to roll in the skimmer tracks. The skimmer rollers have a plurality of load bearing rollers and a pair of center rollers for movably holding the skimmer panel in the tracks. The skimmer panel also has a skimmer seal attached to the side edge and extending against each track to seal the space between the skimmer panel and the tracks. The panel also has a floatable hydrocarbon absorbing boom removably attached to the skimmer panel adjacent the bottom thereof. The absorbing boom is attached with a pair of boom supporting brackets attached to the skimmer panel which allows the boom to rise and fall with the water level and independent of the movement of the skimmer panel. Floatation members may be polymer members sealed to form floats.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
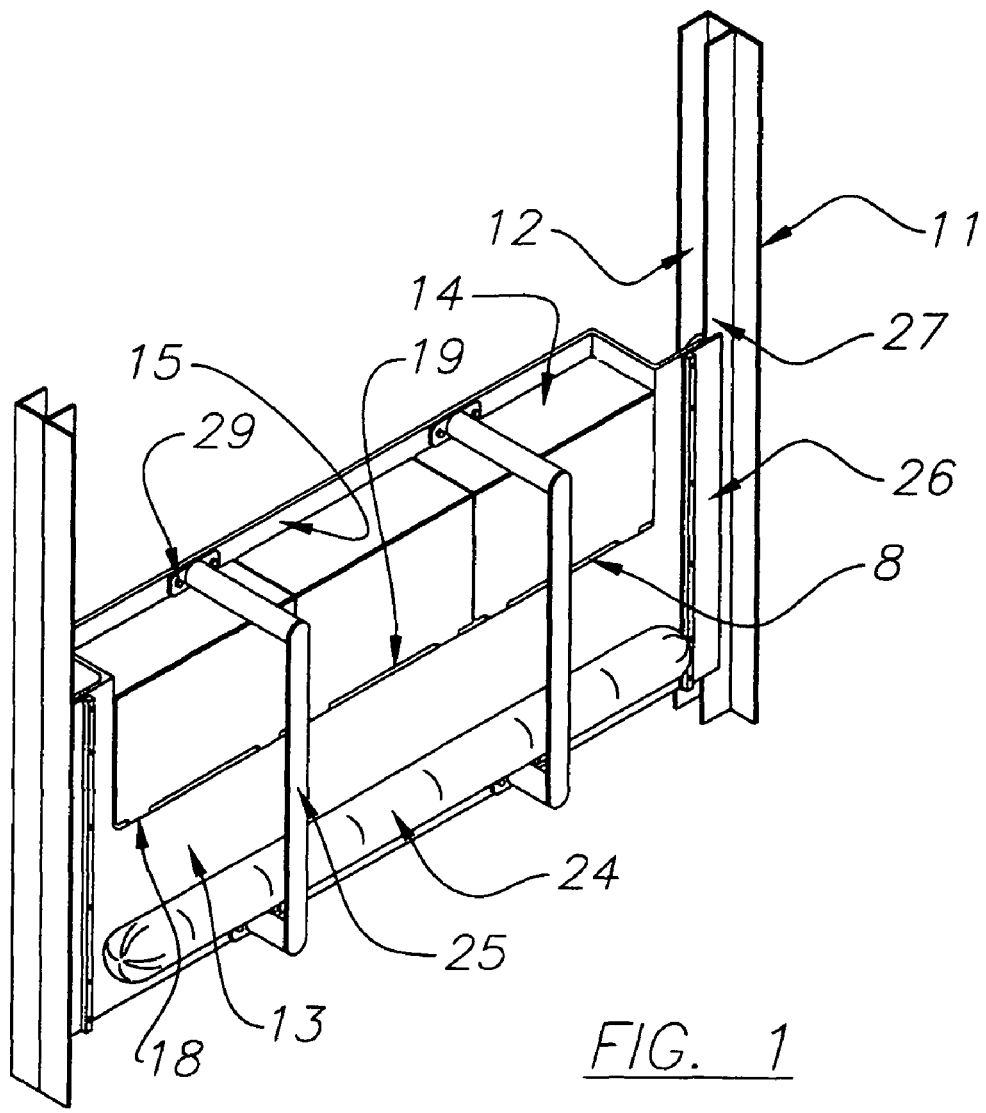
FIG. 1 is a perspective view of a floatable skimmer apparatus mounted in side tracks.
Figure 2:
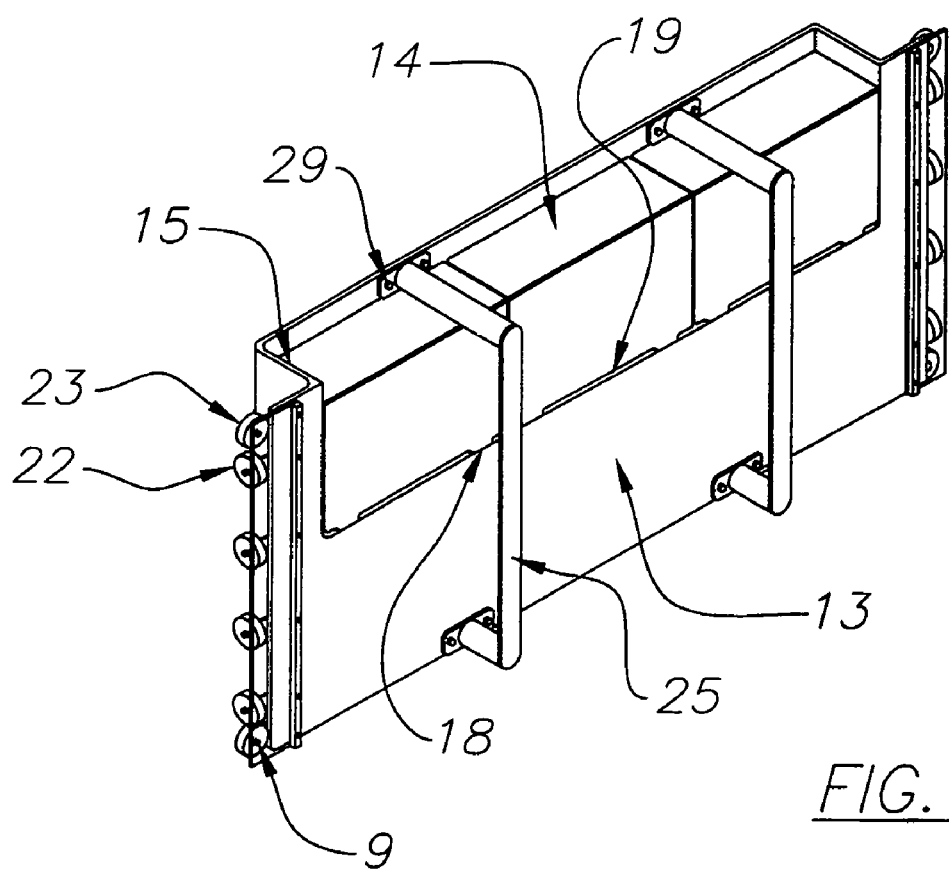
FIG. 2 is a perspective view of the skimmer apparatus of FIG. 1.
Figure 3:
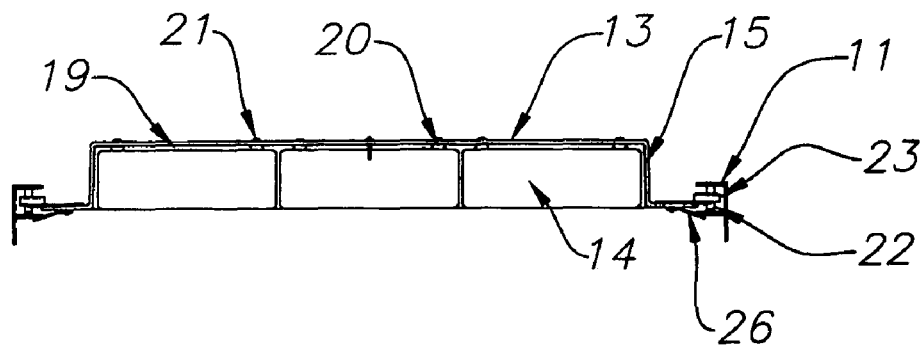
FIG. 3 is a top elevation of the skimmer apparatus of FIG. 1 mounted in tracks.
Figure 4:
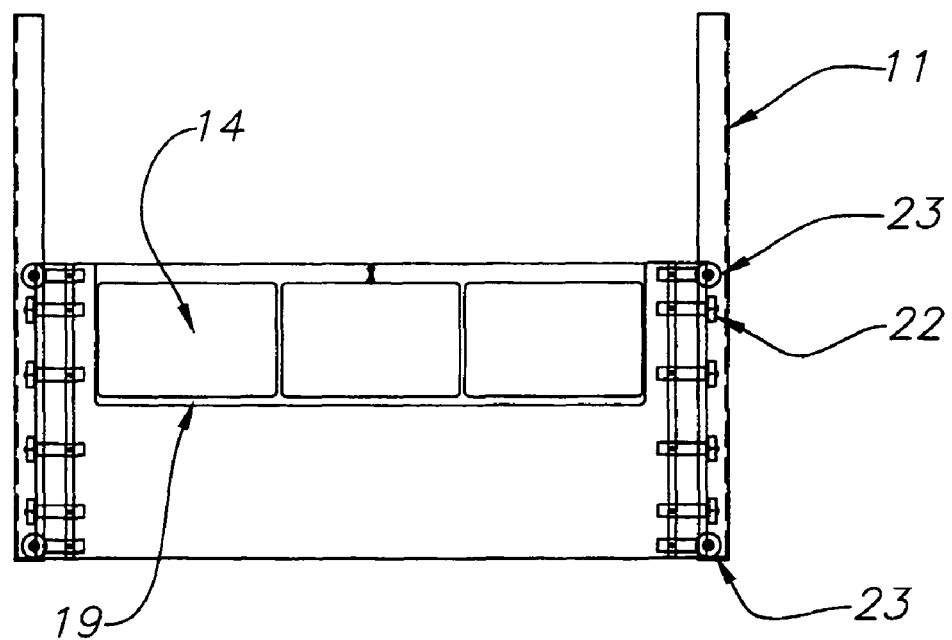
FIG. 4 is a front elevation of the skimmer apparatus of FIGS. 1 and 2.
Figure 5:
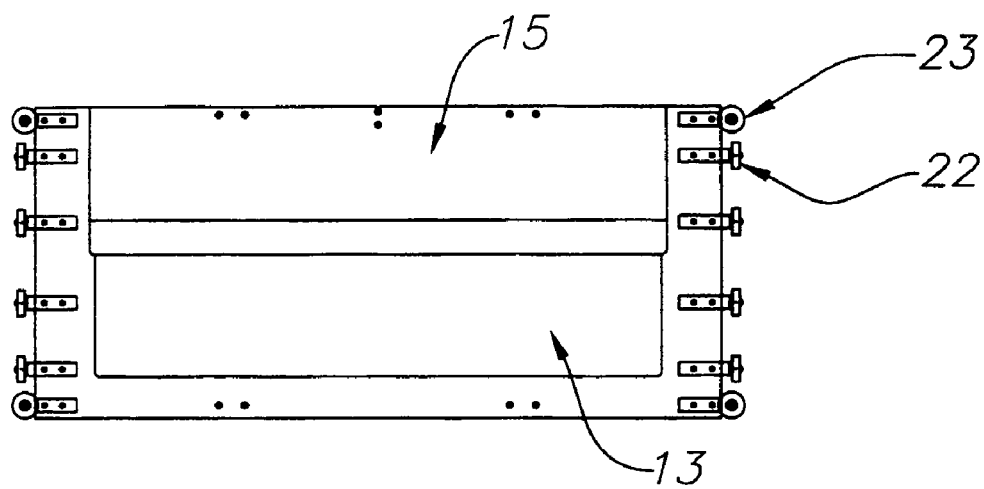
FIG. 5 is a rear elevation of the portable skimmer of FIGS. 1 through 4.

Referring to the drawings, FIGS. 1 through 6, a floatable skimmer 10 is movably supported in a pair of skimmer tracks 11 having track channels 12 therein. The floatable skimmer 10 has a skimmer panel 13 having a plurality of floats 14 attached thereto. Floats 14 may be sealed hollow members or may be made of a lightweight flotation material and are attached within a niche or recessed area 15 within the skimmer panel 13. The skimmer panel 13 niche area 15 has an angled base 16, as more clearly seen in FIG. 6. Each float 14 is mounted within niche 15 and has an angled base 17 which parallels the angled base 16 of the skimmer panel 13. Each float 14 has a plurality of spacers 18 for spacing the float from the skimmer panel 13. The floats may also be seen as having spacers 20, as more clearly seen in FIG. 3, between the rear of the float and the skimmer panel 13. As can also be seen in FIG. 3, a plurality of bolts 21 bolts through the rear of the skimmer panel 13 and through the spacers 20 to attach the floats to the skimmer panel 13 to hold the floats within the niche or recessed area of the skimmer panel 13. Spacing the floats from the skimmer panel has the advantage of allowing water to pass around the floats to raise and lower the floats with the water level while allowing debris that may be caught between the float 14 and the skimmer panel 13 to egress from underneath the float.

Figure 7:
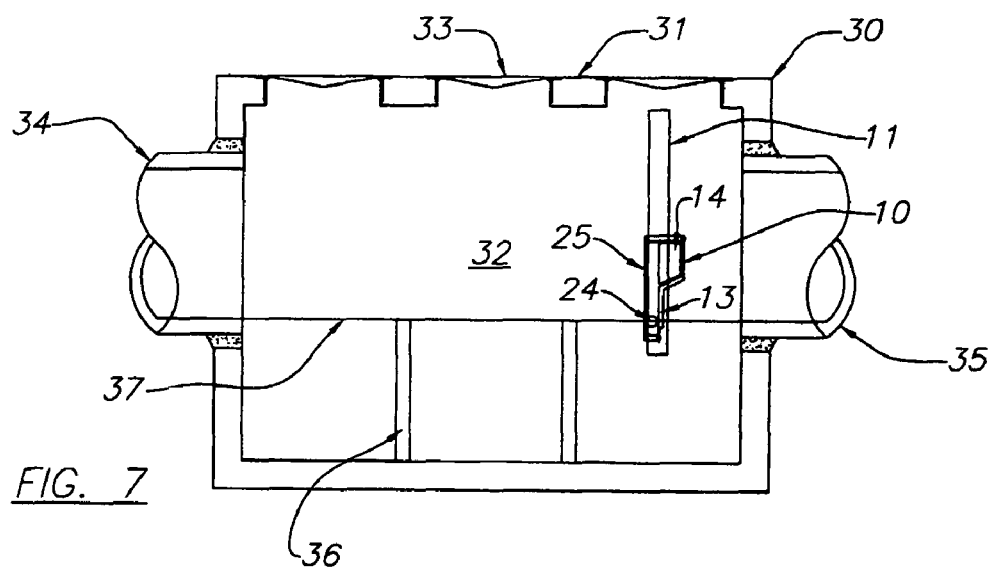
FIG. 7 is a side sectional view of the skimmer apparatus of FIGS. 1 through 5 mounted in a storm water filter box with the water therein at a lower level.
Figure 8:
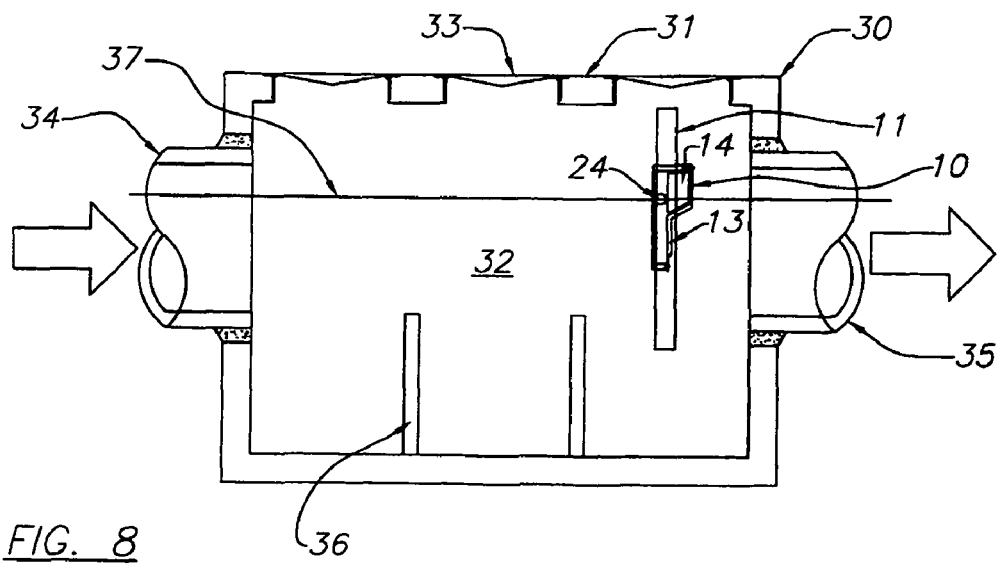
FIG. 8 is a side sectional view of the floatable skimmer and storm water filter box of FIG. 7 having a raised water level.

It should be noted at this point that the floats 14 are mounted facing the storm water filter box inlet so as to raise the skimmer panel in a manner to ease some of the water pressure from the incoming storm water pressing the skimmer panel against the side of the track channel 12 of the tracks 11, as can be seen in FIGS. 7 and 8.

The floatable skimmer 10 has a plurality of load bearing rollers 22 on each side thereof as well as a pair of centering rollers 23 on each side. Each of the rollers 22 and 23 ride within the channel 12 of each track 11. Tracks 11 are mounted to the sides of a housing chamber of a storm water filter box, as shown in FIGS. 7 and 8.

The floatable skimmer 10 also has a floatable hydrocarbon absorbing boom 24, which boom may have a fabric cover and filled with a material for absorbing oil or other hydrocarbon products in the water as the water impinges there against. The absorption boom 24 is supported in a pair of boom brackets 25 which are bolted to the floatable skimmer panel with bolts 29 on the top and bottom thereof. The brackets allow the boom 24 to float up and down relative to the skimmer panel 13 within the brackets 25 to keep them on the level of the water within the storm water filter box. It also allows for the booms to be removed and replaced once they become saturated with hydrocarbons.

The floatable skimmer 10 has a pair of edge seals 26 which are attached to the edge of the skimmer panel 13. Seals 26 extend from the skimmer panel 13 to overlap edge 27 of the skimmer track 11. The seals 26 may be made of a self-lubricating polymer smoothing the slide over the edge 27 to prevent floatable debris from passing along the edges of the floatable skimmer 10 as it moves up and down within the tracks 11. It also protects the rollers 22 and 23 from unnecessary trash getting caught in the tracks within the rollers.

Figure 6:
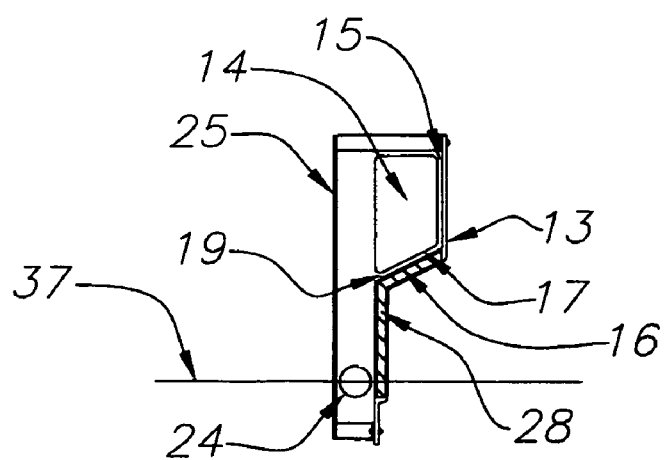
FIG. 6 is a sectional view taken through the floatable skimmer of FIGS. 1 through 5.

As more clearly seen in FIG. 6, additional floatation material 28 is formed in a portion of the skimmer panel 13 to add additional floatation as desired.

Referring to FIGS. 7 and 8, the operation of the floatable skimmer panel 10 can be seen in which the floatable skimmer panel 10 is mounted in side tracks 11 within a storm water filter box 30. The storm water filter box 30 has a housing 31 and housing chamber 32 and a plurality of openings 33 for cleaning out debris and trash captured within the filter box 30. The filter box also has an inlet 34 and an outlet 35 so that storm water enters the inlet 34 and exits the outlet 35. In this storm water filter box, a pair of baffles 36 are mounted along the bottom for capturing sand, gravel or non-floatable trash but it should be clear that these baffles may or may not be included within the filter box 30. In FIG. 7, the floatable skimmer 10 can be seen in a rest position resting on the bottom of the tracks 11 with the water level 37 being at a low point even with or below the level of the outlet 35. In FIG. 8, the water level 37 has risen, such as during a high flow rain event, so that water entering the inlet passes under the skimmer panel 13 and egresses from the outlet 35. The floatable skimmer 10 has been raised in the tracks 11 in FIG. 8 to raise the skimmer panel and block any floating debris as well as oil or other hydrocarbons from passing into the outlet 35. The hydrocarbon absorbing boom 24 can be seen as having been raised to follow the water level within its supporting brackets for absorbing any floating hydrocarbons.

The floating boom thus allows a larger passageway under the skimmer panel 13 while still blocking any floating debris from entering the outlet 35. This has been accomplished in the past by having a fixed skimmer which inherently requires a smaller channel area there beneath and which can overflow the top if the water level reaches a sufficiently high point. Thus, the present floating skimmer maintains a larger water channel through the storm water filter box 30 to handle a greater flow capacity while at all times capturing floatable debris and also captures hydrocarbons with the floatable hydrocarbon absorbing boom 24. The floatable skimmer advantageously has the main floatation attached facing the inlet 34 and has the floats mounted for the water to extend around the floats so that they lift the skimmer panel 13 in a manner to relieve the force of the water pressure from the inflow of water from the inlet 34 against the skimmer panel 13 to make for a smoother movement of the skimmer panel in the tracks 11 as the floatable skimmer moves up and down in the tracks 11.

It should be clear at this time that a floatable skimmer for a storm water system has been provided which advantageously allows the capture of floatable debris and hydrocarbons in the entering storm water while allowing a larger channel for the passage of the storm water by the skimmer and into the outlet of the storm water filter box. However, the present invention is not to be limited to the forms shown which are to be considered illustrative rather than restrictive.

I claim:

1. A storm water filter box having
a floatable skimmer apparatus for preventing floatable debris from entering the filter box outlet comprising:
a housing chamber having an inlet thereinto and an outlet therefrom;
a skimmer panel having a top and a bottom and being positioned in said housing chamber between the inlet and outlet of said housing chamber, said skimmer panel being movably mounted in said housing chamber in a pair of skimmer tracks for movement therein and positioned in said housing chamber to form a channel under said skimmer panel, said skimmer panel having a niche formed therein along the top thereof; and at least one floatation member mounted in said skimmer panel niche on the inlet side of said skimmer panel and being spaced from said skimmer panel to allow water in said housing chamber between said floatation member and said skimmer panel to raise and lower said skimmer panel in said skimmer track with the rise and fall of storm water in said housing chamber to thereby hold the top of said skimmer panel above the water level in said housing chamber;

whereby storm water is forced under the bottom of said floatable skimmer panel while blocking floatable debris from entering said housing chamber outlet.

2. The storm water filter box having a floatable skimmer apparatus in accordance with claim 1 in which said skimmer panel niche has an angled base to allow debris between said at least one floatation member and said skimmer panel to egress therefrom.

3. The storm water filter box having a floatable skimmer apparatus in accordance with claim 2 in which said at least one floatation member has an angled side positioned over said skimmer panel niche angled base and spaced therefrom.

4. The storm water filter box having a floatable skimmer apparatus in accordance with claim 1 in which said skimmer panel has a core of buoyant material.

5. The storm water filter box having a floatable skimmer apparatus in accordance with claim 4 in which said core of buoyant material is polystyrene.

6. The storm water filter box having a floatable skimmer apparatus in accordance with claim 3 in which each said skimmer panel has a pair of side edge portions, each side edge portion having a plurality of rollers mounted thereto rolling in one said skimmer tracks.

7. The storm water filter box having a floatable skimmer apparatus in accordance with claim 6 in which each side of said skimmer panel has a plurality of load bearing rollers and a pair of centering rollers for movably holding said skimmer panel in said pair of tracks.

8. The storm water filter box having a floatable skimmer apparatus in accordance with claim 6 in which said skimmer panel has a skimmer seal attached to each side edge thereof and extending against each track to seal the space between said skimmer panel and each of said pair of tracks.

9. The storm water filter box having a floatable skimmer apparatus in accordance with claim 8 including a hydrocarbon absorbing boom removably attached to said skimmer panel adjacent the bottom thereof.

10. The storm water filter box having a floatable skimmer apparatus in accordance with claim 9 in which said skimmer panel has a pair of boom supporting bracket's attached thereto for removably holding said hydrocarbon absorbing boom thereto.

11. The storm water filter box having a floatable skimmer apparatus in accordance with claim 10 in which said at least one floatation member is a hollow polymer member.

12. The storm water filter box having a floatable skimmer apparatus in accordance with claim 9 in which each of said plurality of floatation members has a plurality of spacing studs formed thereon for spacing each said floatation member from said skimmer panel.

13. The storm water filter box having a floatable skimmer apparatus in accordance with claim 11 in which each said skimmer panel seal is made of a self-lubricating polymer.

14. A storm water filter box having a floatable skimmer apparatus for preventing floatable debris from entering the filter box outlet comprising:

a housing chamber having an inlet thereinto and an outlet therefrom;

a skimmer panel having a top and a bottom and being positioned in said housing chamber between the inlet and outlet of said housing chamber, said skimmer panel being movably mounted in said housing chamber in a pair of skimmer tracks for movement therein and positioned in said housing chamber to form a channel under said skimmer panel;

at least one floatation member mounted on said skimmer panel to raise and lower said skimmer panel in said skimmer track with the rise and fall of storm water in said housing chamber to thereby hold the top of said skimmer panel above the water level in said housing chamber;

a plurality of boom supporting brackets attached to said skimmer panel; and a hydrocarbon absorbing boom removably held in said plurality of boom supporting brackets, said hydrocarbon absorbing boom being floatably held to said skimmer panel in said plurality of boom supporting brackets;

whereby a floatable skimmer panel has a floatable hydrocarbon boom mounted thereto for absorbing floating hydrocarbons.

15. The storm water filter box having a floatable skimmer apparatus in accordance with claim 14 in which each said skimmer panel has a pair of side edge portions, each side edge portion having a plurality of rollers mounted thereto rolling in one said skimmer tracks.

16. The storm water filter box having a floatable skimmer apparatus in accordance with claim 15 in which each side of said skimmer panel has a plurality of load bearing rollers and a pair of centering rollers for movably holding said skimmer panel in said pair of tracks.

17. The storm water filter box having a floatable skimmer apparatus in accordance with claim 16 in which said skimmer panel has a skimmer seal attached to each side edge thereof and extending against each track to seal the space between said skimmer panel and each of said pair of tracks.

18. The storm water filter box having a floatable skimmer apparatus in accordance with claim 17 in which said skimmer panel has a recessed area formed therein along the top thereof having said at least one floatation member mounted therein and spaced from said skimmer panel to allow water in said housing chamber between said flotation member and said skimmer panel.

19. The storm water filter box having a floatable skimmer apparatus in accordance with claim 18 in which said skimmer panel recessed area has an angled base said at least one flotation member has an angled side positioned over said skimmer panel recessed area angles base and spaced therefrom to allow debris between said at least one floatation member and said skimmer panel to egress therefrom.

* * * * *